(12) United States Patent
Wang

(10) Patent No.: US 10,980,167 B2
(45) Date of Patent: Apr. 20, 2021

(54) INDIVIDUAL ROW VACUUM SYSTEM

(71) Applicant: CNH Industrial America LLC, New Holland, PA (US)

(72) Inventor: Ling Wang, Saskatoon (CA)

(73) Assignee: CNH Industrial America LLC, New Holland, PA (US)

( * ) Notice: Subject to any disclaimer, the term of this patent is extended or adjusted under 35 U.S.C. 154(b) by 395 days.

(21) Appl. No.: 16/018,210

(22) Filed: Jun. 26, 2018

(65) Prior Publication Data
US 2019/0387663 A1 Dec. 26, 2019

(51) Int. Cl.
*A01C 7/08* (2006.01)
*A01C 7/10* (2006.01)
*A01C 7/12* (2006.01)

(52) U.S. Cl.
CPC .............. *A01C 7/082* (2013.01); *A01C 7/102* (2013.01); *A01C 7/128* (2013.01)

(58) Field of Classification Search
CPC ......... A01C 7/082; A01C 7/102; A01C 7/128; A01C 7/084; A01C 7/205
See application file for complete search history.

(56) References Cited

U.S. PATENT DOCUMENTS

| | | | | |
|---|---|---|---|---|
| 4,780,279 A * | 10/1988 | Enos | ................... | A01C 1/08 422/111 |
| 5,028,009 A * | 7/1991 | Takata | ................... | A01C 15/04 239/655 |
| 6,145,455 A | 11/2000 | Gust et al. | | |
| 7,174,839 B2 | 2/2007 | Tsing | | |
| 8,336,469 B2 | 12/2012 | Preheim et al. | | |
| 8,443,742 B2 * | 5/2013 | Orrenius | ................. | A01C 7/046 111/179 |
| 9,155,241 B2 | 10/2015 | Rans et al. | | |
| 9,426,940 B2 * | 8/2016 | Connors | ................. | A01C 7/105 |
| 9,474,201 B2 | 10/2016 | Wilhelmi et al. | | |
| 10,575,456 B2 * | 3/2020 | Schoeny | ................. | F16K 1/126 |
| 10,743,460 B2 * | 8/2020 | Gilbert | .................... | A01C 7/042 |
| 2006/0278726 A1 * | 12/2006 | Holly | ..................... | A01C 7/102 239/67 |
| 2010/0205953 A1 * | 8/2010 | Bettin | .................... | A01C 7/081 60/455 |
| 2016/0242352 A1 * | 8/2016 | Hussherr | ................ | A01C 7/082 |

FOREIGN PATENT DOCUMENTS

CN 201403306 Y 2/2010

* cited by examiner

*Primary Examiner* — Jamie L McGowan
(74) *Attorney, Agent, or Firm* — Rebecca L. Henkel; Rickard K. DeMille

(57) ABSTRACT

A planting implement including a toolbar and a seed metering system supported by the toolbar. The seed metering system includes at least one row unit. Each row unit includes a frame, an auxiliary seed hopper supported by the frame, a seed meter fluidly coupled to the auxiliary seed hopper, and a vacuum fan fluidly coupled to the auxiliary seed hopper and the seed meter in a closed fluid system in which the vacuum fan recirculates air through the auxiliary seed hopper and the seed meter.

10 Claims, 4 Drawing Sheets

INDIVIDUAL ROW VACUUM SYSTEM

FIELD OF THE INVENTION

The present invention pertains to agricultural implements and, more specifically, to planting implements with seed metering systems.

BACKGROUND OF THE INVENTION

After a field has been worked, for example plowed, tilled and/or finished, a planting implement, i.e., a planter, may be towed behind an agricultural vehicle to simultaneously create numerous rows of planted seeds by disking furrows and planting the seeds within the furrows via a pneumatic seed planting system. Typically, planters can include one or more main seed tank(s), row units that are distributed across the width of a toolbar, and a pneumatic system to transport the seeds or fertilizer from the storage tanks to the row units. Each row unit generally includes auxiliary seed hoppers, a metering device, discs to cut the furrow in the field, closing discs, and press wheels. Thereby, the row units each respectively open a trench in the field, deposit seeds via the metering device, close the trench, and pack soil onto the seed in order to plant the seeds.

The pneumatic system may include an air pressure differential system, an air compressor system, an electric generator, and various hoses and/or conduits to transport the seeds from the main seed tank(s) to the respective auxiliary seed hoppers. Many modern planters have air pressure differential systems which include a centralized vacuum fan that facilitates seed transportation to the multiple row units. As can be appreciated, the single vacuum fan cannot specifically tailor a variable vacuum pressure for each row unit. Further, if an operator desires to not use one or more of the row unit(s) to plant fewer rows of seed, the single vacuum fan cannot shut off the row unit(s) which are not presently planting seed. Additionally, it is typical for the pneumatic system to be an open airflow system. Meaning, air from the surrounding atmosphere is drawn into the intake of the metering devices, and the single vacuum fan exhausts the resultant pressurized air back into the surrounding atmosphere. This open airflow system may lead to energy loss as well as to the contamination of the surrounding atmosphere due to chemicals present within the airstream. Also, some metering devices can become clogged because debris, for example dust or crop residue, may collect on the air intake port of a respective metering device.

What is needed in the art is a cost-effective and energy efficient seed metering system.

SUMMARY OF THE INVENTION

In one exemplary embodiment formed in accordance with the present invention, there is provided a seed metering system that includes at least one row unit that has an auxiliary seed hopper, a seed meter, and an on-row vacuum fan which are fluidly coupled to one another in a closed fluid system. The vacuum fan on each respective row unit recirculates the air through the seed meter by drawing air out of one side of the seed meter to create a vacuum and exhausting air into the other side of the seed meter by way of blowing into the auxiliary seed hopper intake port.

In another exemplary embodiment formed in accordance with the present invention, there is provided a planting implement including a toolbar and a seed metering system supported by the toolbar. The seed metering system includes at least one row unit. Each row unit includes a frame, an auxiliary seed hopper supported by the frame, a seed meter fluidly coupled to the auxiliary seed hopper, and a vacuum fan fluidly coupled to the auxiliary seed hopper and the seed meter in a closed fluid system in which the vacuum fan recirculates air through the auxiliary seed hopper and the seed meter.

In yet another exemplary embodiment formed in accordance with the present invention, there is provided a seed metering system for a planting implement. The seed metering system includes at least one row unit. Each row unit includes a frame, an auxiliary seed hopper supported by the frame, a seed meter fluidly coupled to the auxiliary seed hopper, and a vacuum fan fluidly coupled to the auxiliary seed hopper and the seed meter in a closed fluid system in which the vacuum fan recirculates air through the auxiliary seed hopper and the seed meter.

In yet another exemplary embodiment formed in accordance with the present invention, there is provided a method including the step of providing a planting implement. The planting implement includes a toolbar and a seed metering system supported by the toolbar. The seed metering system includes at least one row unit. Each row unit includes a frame, an auxiliary seed hopper supported by the frame, the auxiliary seed hopper has an air intake port, a seed meter fluidly coupled to the auxiliary seed hopper, the seed meter has a vacuum port, and a vacuum fan fluidly coupled to the auxiliary seed hopper and the seed meter in a closed fluid system. The method also includes the steps of drawing air out of the vacuum port of the seed meter and recirculating the air by exhausting the air into the air intake port of the auxiliary seed hopper.

One possible advantage of the exemplary embodiment of the seed metering system is that the vacuum pressure for each seed meter can be individually controlled.

Another possible advantage of the exemplary embodiment of the seed metering system is increased energy efficiency because the on-row vacuum fan recirculates the air through the seed meter by drawing air out of one side of the seed meter and exhausting air into the other side of the seed meter.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
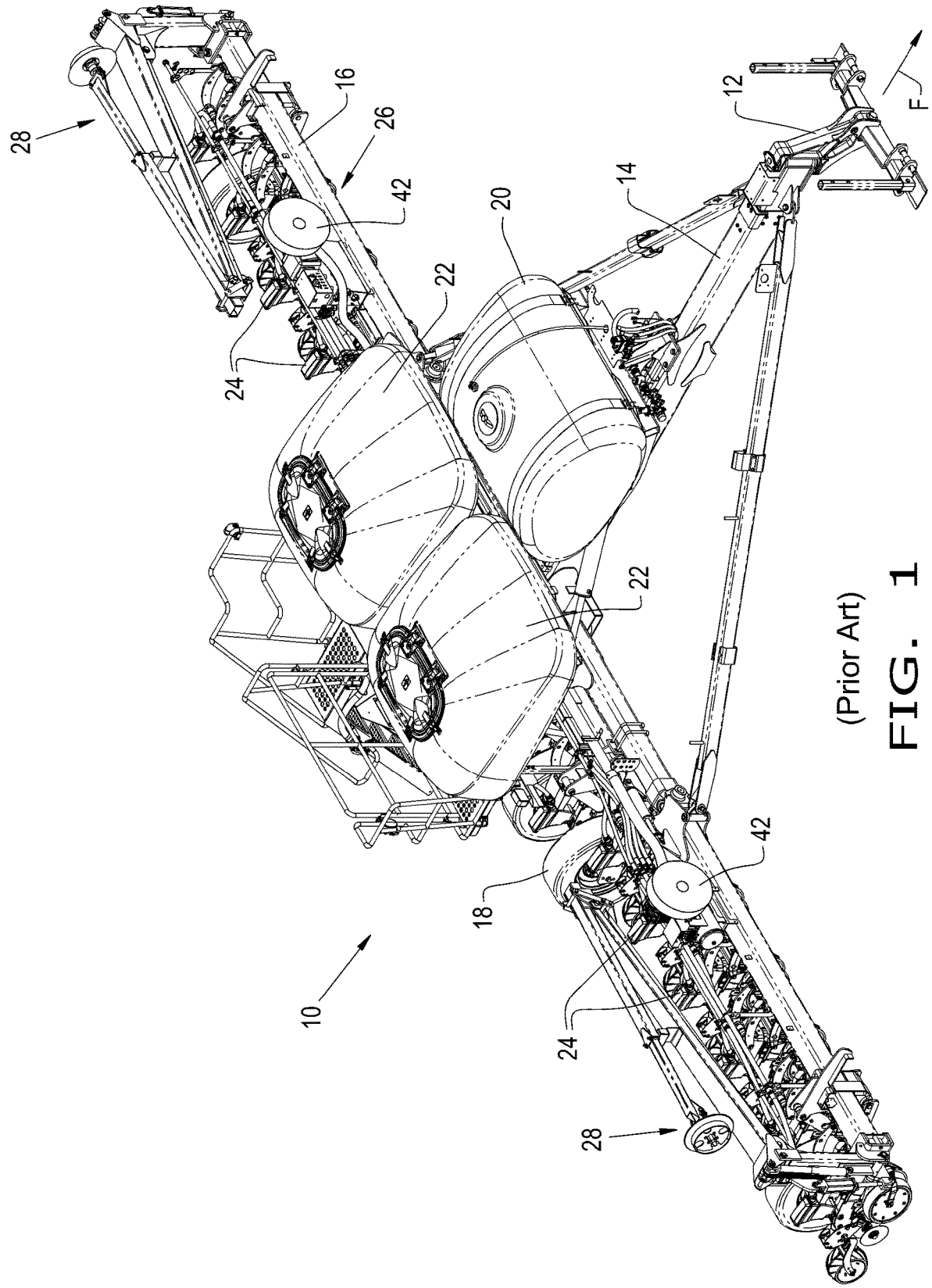
FIG. 1 is a perspective view of a known planter having centralized vacuum fans which each accommodate multiple row units.
Figure 2:
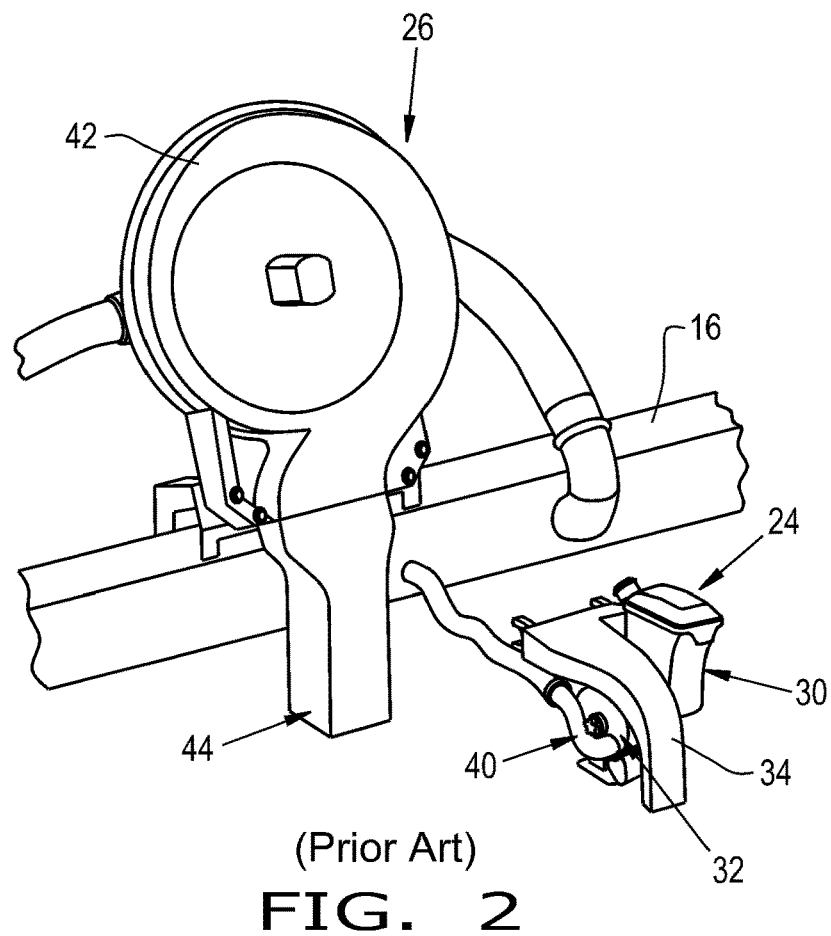
FIG. 2 is a perspective view of a vacuum fan of the planter of FIG. 1.
Figure 3:
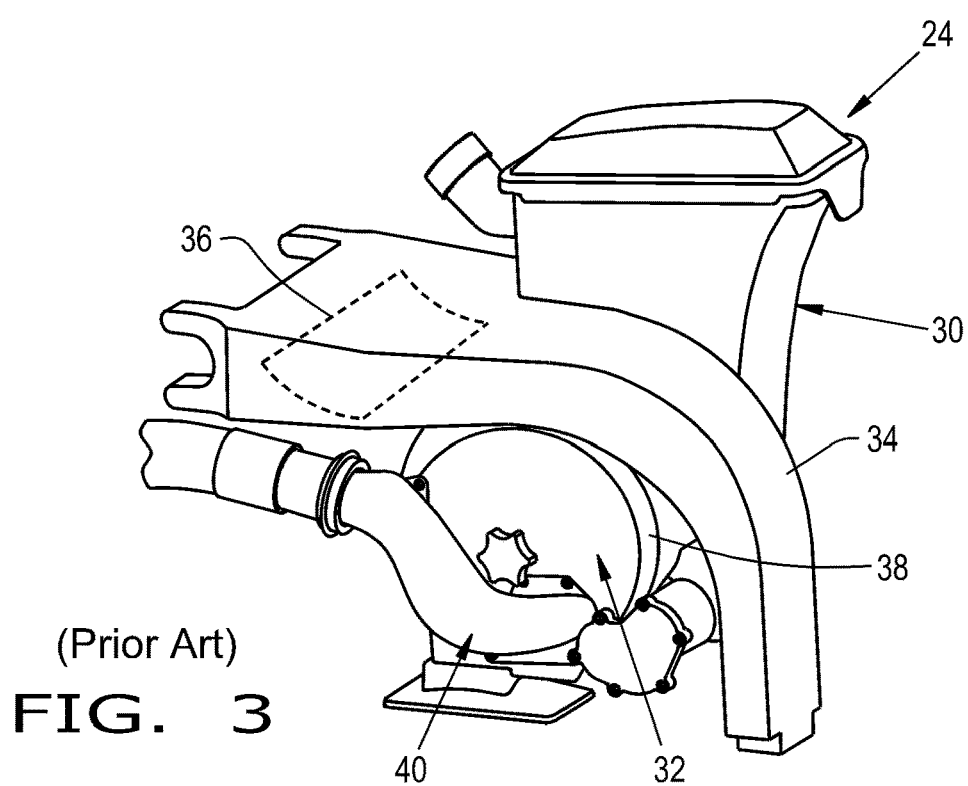
FIG. 3 is a perspective view of a metering device of the planter of FIG. 1.

Referring now to the drawings, and more particularly to FIGS. 1-3, there is shown a known agricultural implement 10 in the form of a planter 10. The planter 10 may be connected to and pulled behind an agricultural vehicle (not shown) to traverse a field in a forward direction of travel "F". The planter 10 generally includes a hitch assembly 12, a frame 14 which may include a foldable toolbar 16, main wheels 18 supporting the frame 14, storage tanks in the form of a chemical tank 20 and at least one seed tank 22, row units 24 attached along the width of the toolbar 16, and a pneumatic system 26. Also, the planter 10 includes a pair of marking discs 28 and various hydraulic, pneumatic, and electrical lines to support the various systems on the planter 10.

Each row unit 24 can include auxiliary seed hoppers 30, a metering device 32, gauge wheels, opening discs to cut the furrow in the field, closing discs to close the furrow, and press wheels that gently pack the dirt over the seeds to help germinate the seeds (not shown). Each seed hopper 30 can have an integrally formed, support member 34 which has an air intake port 36 that allows air to flow into the seed hopper 30, and thereby into the metering device 32 (FIG. 3). Typically, the seed metering device 32 is a seed meter 32 that includes a housing 38, a seed disc with perforations, seed input and output ports, pressure and vacuum chambers on a respective side of the seed disc, a seed tube with a conveyor connected to the seed output port, and a vacuum port 40 fluidly coupled to the vacuum chamber.

The pneumatic system 26 may include various hoses and/or conduits to transport the seeds from the seed storage tanks 22 to each auxiliary seed hopper 30. The pneumatic system 26 typically includes one or more air pressure differential device(s), such as vacuum fans 42 associated with the toolbar 16, an air compressor system, and an electric generator (not shown). Each vacuum fan 42 has an exhaust port 44. The level of pressure within the metering devices 32 may be controlled by the speed of the vacuum fan 42 and/or the pitch of the fan blades.

In operation, as the planter 10 is pulled in the forward direction, the pneumatic system 26 moves the seed from the storage tanks 22 to the auxiliary seed hoppers 30, and the seed is then transferred to from the auxiliary seed hoppers 30 onto the seed discs of the seed metering devices 32 via pressure differential control. In more detail, air from the surrounding atmosphere flows into the intake ports 36 of the seed hoppers 30, and this air is subsequently drawn out by the vacuum fan 42 through the auxiliary seed hoppers 30 and the seed metering devices 32 in order create a sufficient vacuum pressure within the metering devices 32 to hold the seed on the seed discs at desired locations (FIG. 3). Then, each seed disc passes the seed onto the conveyor for controlled deposition of the seed into the ground. The vacuum fan 42 creates this vacuum pressure by drawing air out of the vacuum ports 40 of the seed metering devices 32. The vacuum fan 42 then exhausts this air by forcibly blowing the air outwardly though the exhaust port 44 and into the atmosphere (FIG. 2). Hence, the planter 10 has an open fluid system in which air is drawn from the atmosphere and is then subsequently exhausted into the atmosphere.

The vacuum fan 42, which accommodates multiple seed metering devices 32 simultaneously, can lead to energy inefficiencies because the vacuum pressure is continually provided even though one or more of the seed metering devices 32 may not be presently planting seed. Additionally, the continual circulation of air from the surrounding atmosphere by the vacuum fan 42 can lead to energy losses because of frictional losses within the fluid conduits. Further, if the air intake port 36 becomes clogged, the system will experience a diminished airflow which may also lead to energy losses as well as seed misplacement. Also, the open airflow system can lead to the contamination of the surrounding atmosphere as a result of the chemicals present within the airstream ejecting from the vacuum fan 42.

Figure 4:
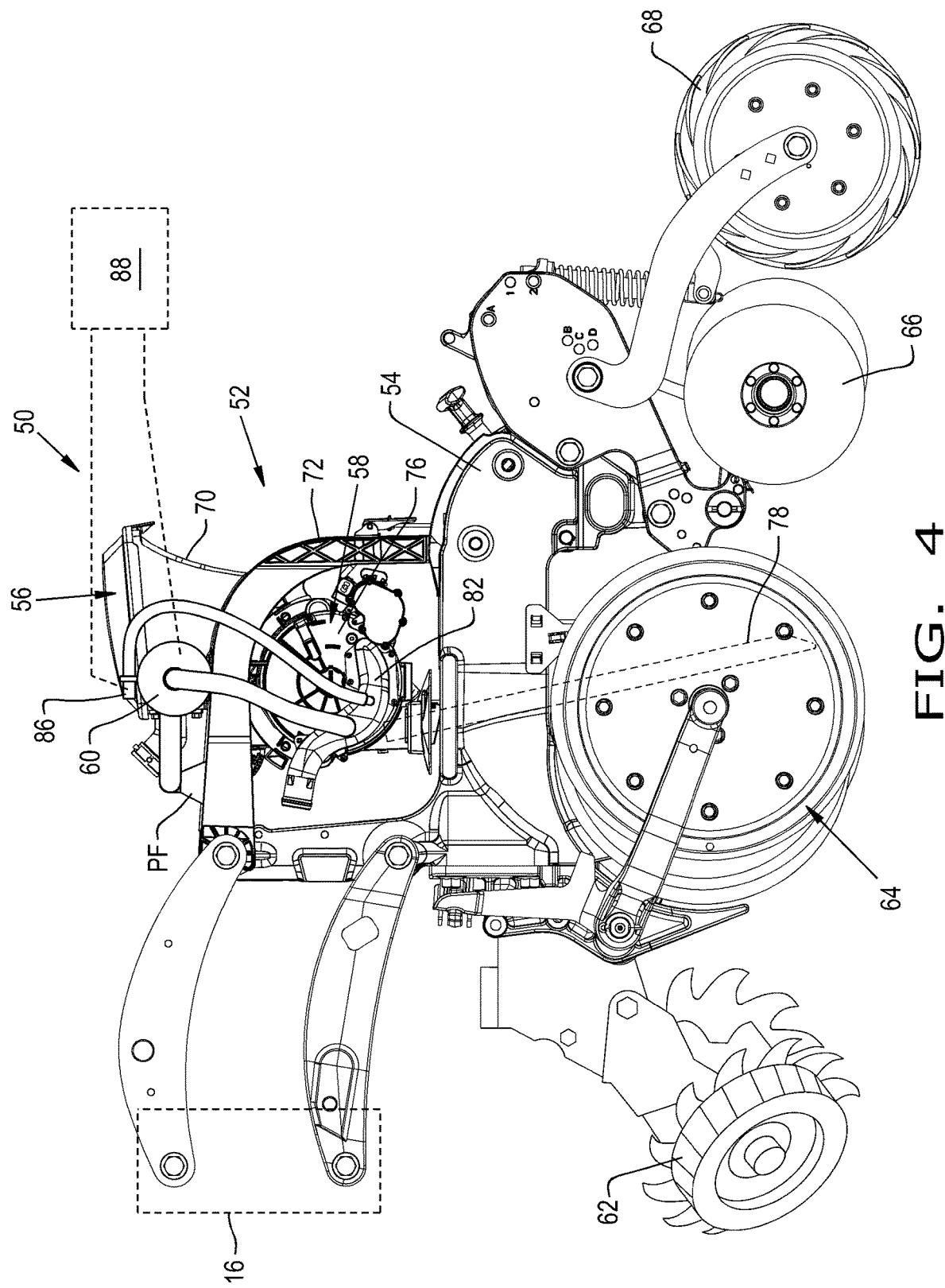
FIG. 4 illustrates a side view of an exemplary embodiment of an on-row seed metering system, the on-row seed metering system including a vacuum fan and a metering device each respectively positioned on the row unit, in accordance with an exemplary embodiment of the present invention.
Figure 5:
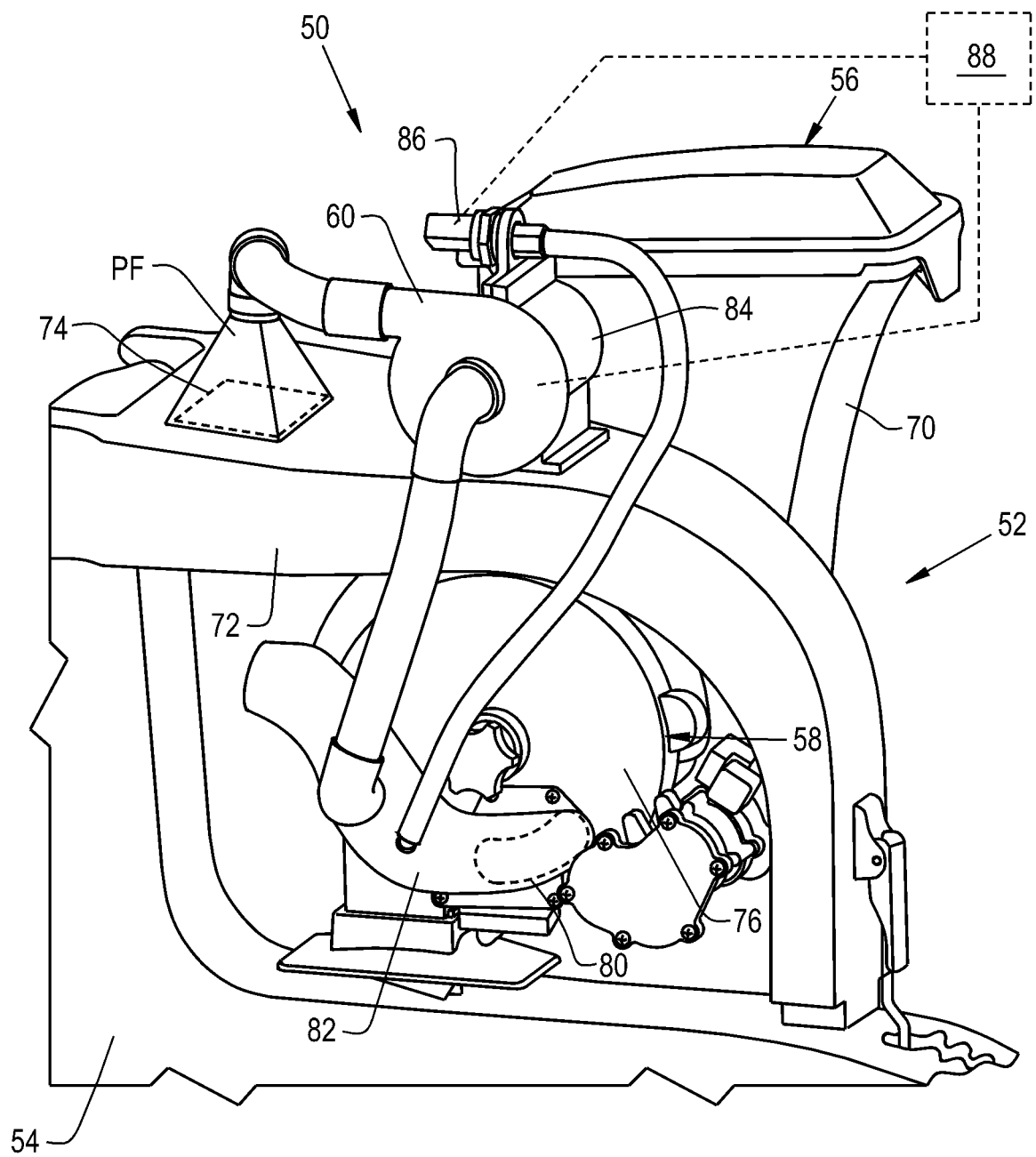
FIG. 5 illustrates a perspective view of the on-row seed metering system of FIG. 4, in accordance with an exemplary embodiment of the present invention.

Referring now to FIGS. 4-5, there is shown an exemplary embodiment of an on-row seed metering system 50, i.e. an individual row vacuum system 50, according to the present invention. The seed metering system 50 may be incorporated into any desired agricultural implement. For example, the seed metering system 50 may be incorporated into the planter 10, except for the row units 24 and the vacuum fans 42. The seed metering system 50 can be connected to and supported by the toolbar 16 of the planter 10 and may generally include at least one row unit 52. For instance, the seed metering system 50 may include multiple row units 52, such as eight, twelve, or twenty-four row units 52.

Each row unit 52 generally includes a frame 54, an auxiliary seed hopper 56 supported by the frame 54, a seed meter 58 coupled to the auxiliary seed hopper 56, and a vacuum fan 60 fluidly coupled to the auxiliary seed hopper 56 and the seed meter 58 in a closed fluid system in which the vacuum fan 60 recirculates air through the auxiliary seed hopper 56 and the seed meter 58. Each row unit 24 may also include field residue wheels 62, opening discs 64 to cut the furrow in the field, closing discs 66 to close the furrow, and press wheels 68 that gently pack the dirt on top of the seeds to help germinate the seeds. As can be appreciated, the auxiliary seed hopper 56, the seed meter 58, and the vacuum fan can be electrically and/or fluidly connected by various electrical or fluid lines, i.e., fluid hoses (unnumbered).

Each auxiliary seed hopper 56 can have a bin 70, with an internal space defined therein for temporally storing the seed, and a support member 72 structurally connected to the body of the bin 70 and fluidly coupled to the internal space within the bin 70. The support member 72 may mount the bin 70 onto the frame 54 of the row unit 52. The support member 72 may include an air intake port 74 (FIG. 5) such that air is allowed to pass through the support member 72, into the bin 70, and onto the seed meter 58. The support member 72 may be in the form of a structural duct, formed of any suitable material such as plastic, which has an internal passageway therethrough for allowing air to enter the auxiliary seed hopper 56. The support member 72 may be formed integrally with the bin 70 of the auxiliary hopper 56. However, instead of being integrally formed, the support member 72 can be connected to the bin 70 as a separate subcomponent via known fasteners. The support member 72 can have any desired shape, for instance, the support member 72 can be in the form of an arced support member 72. Thereby, the front portion of the arced support member 72 may include the air intake port 74 and may connect to the frame at a first location, and the rear of the arced support member 72 may curve downwardly to connect to the frame at a second location. As shown, the arced support member 72 additionally includes a pyramidal frustum PF which extends upwardly above the surrounding top surface of the arced support member 72 and fluidly connects the vacuum fan 60 to the internal passageway of the arced support member 72. In an alternative embodiment, each seed hopper 56 may not include an arced support member 72 such that the bin 70 or another portion of the auxiliary seed hopper 56 includes the air intake port 74 for allowing air to enter the auxiliary seed hopper 56.

The seed meter 58 may include a housing 76, a seed disc with perforations to temporality hold the seed, seed input and output ports, pressure and vacuum chambers on a respective side of the seed disc, a seed tube 78 with a conveyor connected to the seed output port, and a vacuum port 80 fluidly coupled to the vacuum chamber. The seed meter 58 may also include a vacuum duct 82 fluidly coupled to the vacuum port 80. The seed meter 58 may be substantially similar to a known seed meter 32 as described above, except for the vacuum duct 82. The vacuum duct 82 may have any desired shape and may be composed of any desired material, such as plastic. Alternatively, the seed meter 58 may not include a vacuum duct 82, and thereby the vacuum fan 60 may be directly coupled to the vacuum port 80.

The vacuum fan 60 may be fluidly coupled to air intake 74 of the support member 72 of the auxiliary seed hopper 56 and the vacuum duct 82 of the seed meter 58 in a closed fluid system. The vacuum fan 60 may create a negative pressure in the vacuum chamber of the seed meter 58 by drawing air out of the vacuum port 80 of the seed meter 58 and a positive pressure in the pressure chamber by forcibly blowing air through the auxiliary seed hopper 56. The vacuum fan 60 may be mounted onto the auxiliary seed hopper 56. The vacuum fan 60 can be in the form of any desired fan, for example a hydraulic or electric fan. If each row unit 52 further includes a fan mount 84, the vacuum fan 60 can be mounted onto the auxiliary seed hopper 56 via the fan mount 84 (FIG. 5). As shown, the fan mount 84 is connected to the top surface of the support member 72. The fan mount 84 can be in the form of any desired mounting bracket. Alternatively, it should be appreciated that the vacuum fan 60 may be mounted to the row unit 52 at any desired location, such as connected to the frame 54, a portion of the bin 70 of the auxiliary seed hopper 56, the housing 76 of the meter device 58, and/or a separate mounting bracket that is coupled to the toolbar 16.

In a further embodiment, the seed metering system 50 may also include a vacuum sensor 86 which is fluidly coupled to the vacuum port 80 of the seed meter 58, by way of the vacuum duct 82. As shown, the vacuum sensor 86 has a fluid line (unnumbered) interconnecting the vacuum sensor 86 to the vacuum duct 82. The fan mount 84 may additionally mount the vacuum sensor 86 so that the vacuum sensor 86 may be located next to the vacuum fan 60 (FIG. 5). The vacuum sensor 86 can be any desired pressure differential sensor, such as a pressure transducer.

The seed metering system 50 may further include a control unit 88 operably coupled to the vacuum fan 60 and to the vacuum sensor 86. The control unit 88 can individually and/or collectively control a single vacuum fan 60 or multiple vacuum fans 60 simultaneously. The control unit 88 can also independently control one or more of the vacuum fan(s) 60. The control unit 88 may shut off or turn on the vacuum fan(s) 60, increase or decrease the speed of the vacuum fan(s) 60, alter the pitch of the fan blades, and/or change the direction of rotation of the vacuum fan(s) 60 based upon preprogramed software, a GPS signal, an operator command, and/or a pressure signal from the vacuum sensor 86. The control unit 88 can be in the form of multiple controllers associated with each row unit 52 and/or the control unit 88 may be integrated into the existing control unit of the implement or agricultural vehicle. The control unit 88 may include a processor and a memory. The processor of the control unit 88 may include one or more general purpose processor(s), one or more application specific integrated circuit(s), one or more field programmable gate array(s), or the like. Additionally, the memory of the control unit 88 may be any tangible, non-transitory, computer readable medium that is capable of storing software executable by the processor.

In operation, the control unit 88 collectively and/or individually controls the vacuum fans 60 of each row unit 52 so that air is drawn out of the seed meter 58, into and through the vacuum fan 60, which then blows, e.g. exhausts, the air so that the air forcibly enters the auxiliary seed hopper 56 and finally back into the seed meter 58 via the connection between the auxiliary seed hopper 56 and the seed meter 58. This cycle repeats itself to create the closed airflow system. Thus, the air is continually recirculated through the seed meter 58 by drawing air out of the vacuum port 80 into the vacuum fan 60 and exhausting air into the intake port 74 of the auxiliary seed hopper 56 so that the air then assists in holding the seeds onto the seed disc of the seed meter 58. Furthermore, each row unit 52 is independent in that a respective seed meter 58 of the row unit 52 does not have additional fluid lines that couple to a centralized vacuum fan 42 as discussed above. Meaning, if one or more of the row units 52 are not presently planting, the particular vacuum fan(s) 60 may be shut off to cease the vacuum generation within the seed meter 58, and/or if some of the row units 52 are planting a different type of seed than the others, these row units 52 may operate at a different pressure level to accommodate the different type of seed. Hence, the closed airflow system of the seed metering system 50 avoids the issues of the aforementioned row units 24 and vacuum fans 42.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A planting implement, comprising:
a toolbar; and
a seed metering system supported by the toolbar and including at least one row unit, each row unit including:
   a frame;
   an auxiliary seed hopper supported by the frame;
   a seed meter fluidly coupled to the auxiliary seed hopper; and
   a vacuum fan fluidly coupled to the auxiliary seed hopper and the seed meter in a closed fluid system in which the vacuum fan recirculates air through the auxiliary seed hopper and the seed meter;
wherein the auxiliary seed hopper has an air intake port and the seed meter has a vacuum port such that the vacuum fan recirculates air through the seed meter by drawing air out of the vacuum port of the seed meter and exhausting air into the air intake port of the auxiliary seed hopper;
wherein each row unit further includes a vacuum sensor fluidly coupled to the vacuum port of the seed meter;
wherein each row unit further includes a fan mount which mounts the vacuum fan onto the auxiliary seed hopper;
wherein the auxiliary seed hopper includes a support member that fluidly connects the vacuum fan to an inside of the auxiliary seed hopper, and the fan mount is mounted onto the support member.

2. The planting implement of claim 1, wherein the vacuum fan is mounted onto the auxiliary seed hopper.

3. The planting implement of claim 1, wherein the fan mount additionally mounts the vacuum sensor onto the auxiliary seed hopper.

4. The planting implement of claim 1, wherein the seed metering system further includes a control unit operably coupled to the vacuum fan and to the vacuum sensor, and the control unit is configured to control the vacuum fan.

5. The planting implement of claim 4, wherein the at least one row unit is in the form of a plurality of row units such that each vacuum fan of each row unit of the plurality of row units is independently controlled by the control unit.

6. A seed metering system for a planting implement, comprising:
   at least one row unit, including:
     a frame;
     an auxiliary seed hopper supported by the frame;
     a seed meter fluidly coupled to the auxiliary seed hopper; and
     a vacuum fan fluidly coupled to the auxiliary seed hopper and the seed meter in a closed fluid system in which the vacuum fan recirculates air through the auxiliary seed hopper and the seed meter;
   wherein the auxiliary seed hopper has an air intake port and the seed meter has a vacuum port such that the vacuum fan recirculates air through the seed meter by drawing air out of the vacuum port of the seed meter and exhausting air into the air intake port of the auxiliary seed hopper;
   wherein each row unit further includes a vacuum sensor fluidly coupled to the vacuum port of the seed meter;
   wherein each row unit further includes a fan mount which mounts the vacuum fan onto the auxiliary seed hopper;
   wherein the auxiliary seed hopper includes a support member that fluidly connects the vacuum fan to an inside of the auxiliary seed hopper, and the fan mount is mounted onto the support member.

7. The seed metering system of claim 6, wherein the vacuum fan is mounted onto the auxiliary seed hopper.

8. The seed metering system of claim 6, wherein the fan mount additionally mounts the vacuum sensor onto the auxiliary seed hopper.

9. The seed metering system of claim 6, wherein the seed metering system further includes a control unit operably coupled to the vacuum fan and to the vacuum sensor, and the control unit is configured to control the vacuum fan.

10. The seed metering system of claim 9, wherein the at least one row unit is in the form of a plurality of row units such that each vacuum fan of each row unit of the plurality of row units is independently controlled by the control unit.

* * * * *